April 5, 1960     G. DIETRICH     2,931,239
MANUAL AND HYDRAULIC POWER ACTUATED STEERING GEAR
Filed Oct. 26, 1956
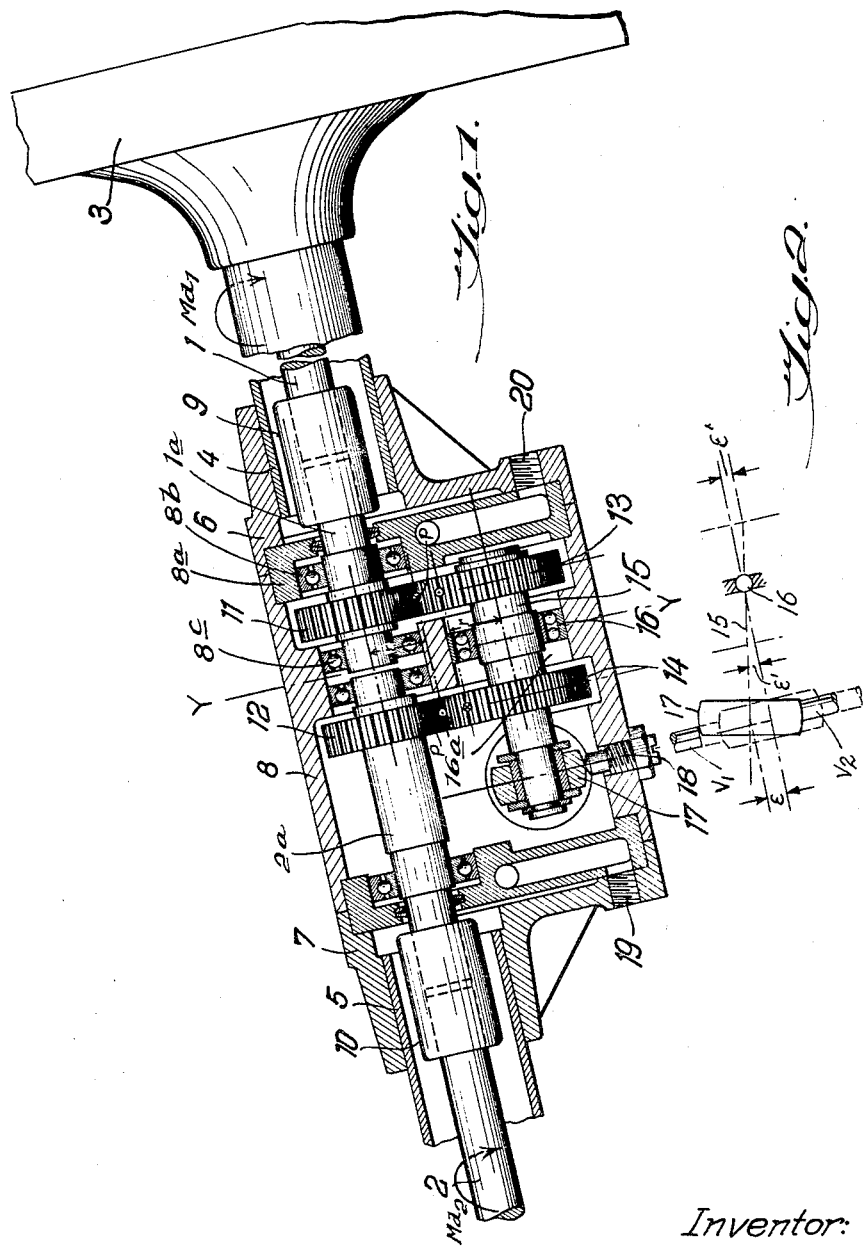
Inventor:
GEORG DIETRICH,
By Parry + Giese
ATTORNEYS United States Patent Office 2,931,239
Patented Apr. 5, 1960

2,931,239

MANUAL AND HYDRAULIC POWER ACTUATED STEERING GEAR

Georg Dietrich, Schwabisch Gmund, Germany, assignor to Zahnradfabrik Friedrichshafen, Friedrichshafen am Bodensee, Germany Application October 26, 1956, Serial No. 618,615

Claims priority, application Germany October 26, 1955

5 Claims. (Cl. 74—388)

This invention relates to mechanisms for effecting manual steering combined with power steering and more particularly to a means for simultaneously effecting both types of steering.

It is an object of the invention to provide a mechanism wherein the steering of the vehicle is under complete manual control but in which the primary force required to effect steering is supplied by hydraulic power means.

It is another object of the invention to provide a power assisted steering mechanism wherein the control of the hydraulic power means is effected through rotary members having freedom for limited movement transverse to their axis of rotation and displaceable by torque reaction of the steering load.

It is another object of the invention to provide a construction wherein the control of the hydraulic power means is effected to an amplified extent relative to the amount of transverse movement of said rotary members.

It is a further object of the invention to provide a structural assembly comprising a housing wherein the reaction of the torque forces effected by manual twisting of a steering wheel is zero or substantially zero, so that little or no stress is experienced by the housing.

In attaining the above objects I provide a steering mechanism comprising a pair of aligned shafts one of which is manually operated as by a steering wheel and the other of which is adapted for coupling to the vehicle steering linkage. Manual steering torque is transmitted from the first to the second of these shafts through a third shaft carried in the same housing in which housing are mounted the first two shafts. Each of the first two shafts carries a gear which engages with a respective gear on the third shaft. The third shaft has a universal mounting so that it experiences simultaneously a rotation about its axis as well as an oscillation about an axis normal thereto when the steering wheel is rotated. Inasmuch as an actuator for controlling the power steering system is carried by the third shaft, the oscillatory motion of said actuator is transmitted to hydraulic valves which will be understood to control the hydraulic power means. The arrangement of the shafts and gearing in the housing is such that the net thrusts and torque reactions in effect between these elements adds up to zero.

A detailed description of my invention now follows in conjunction with the appended drawing in which:

Fig. 1 shows a longitudinal cross section through the basic elements of the invention, and Fig. 2 is a diagrammatic representation of the power steering actuator means shown in two positions on a plane at right angles to the position shown in Fig. 1.

Referring now to the drawing, a steering wheel 3 is keyed to a shaft 1 having an additional section 1a coupled thereto as by a coupling 9. The steering wheel is supported with respect to a housing 8 by means of a sleeve 4. However, torque forces of the wheel 3 are transmitted through 1 and 1a to a bearing support plate 8a and then in turn to a bearing 8b. Keyed to the shaft 1a is a gear 11, the lower end of the shaft being supported in a further bearing 8c. In a similar arrangement, extending out of the housing 8, is a shaft 2 keyed through a coupling 10 to an extension 2a, which carries a gear 12. Thus the shaft 1 and 1a may be considered as a single integral shaft and will be hereinafter referred to as the shaft 1. Similarly shafts 2 and 2a will be hereinafter referred to as the shaft 2. A sleeve 5 surrounds the shaft 2 proper and serves to support the casing with respect to the vehicle frame.

The sleeves 4 and 5 are press fitted into the cover plates 6 and 7, respectively, of the housing 8. The cover plates are provided with lubrication bores 19 and 20 as shown.

Within the housing 8 there is disposed a third shaft 15 carried in a universal type swivel bearing 16 peripherally secured within a bore 16a of the housing. Disposed on each side of the bearing 16 are gears 14 and 13. Thus, the gear 14 meshes with the gear 12 and the gear 13 meshes with the gear 11, it being understood that the pair of gears 13 and 14 are keyed to the shaft 15.

Secured at the lower end of shaft 15 is an actuator means 17 which will be understood to control valve rods $V_1$ and $V_2$ of a hydraulic power boosting system. Thus the element 17 may be in the form of a flat sided cam, the general arrangement being as shown in the U.S. patent to Hammond No. 2,650,669. An adjustment screw 18 is provided which likewise finds its counterpart in the aforementioned patent.

Owing to the swivel mounting effected by the bearing 16 it will be apparent that shaft 15 has not only a rotative motion about its own axis but can also oscillate about the normal axis Y—Y, it being understood that the teeth of the gears 11, 12, 13 and 14 are suitably convex so as not to restrict such oscillatory motion of shaft 15.

Thus, when steering wheel 3 is rotated the ensuing rotation of gear 11 drives gear 13 to effect rotation of shaft 15 and gear 14, which latter rotation is transmitted to gear 12 to turn shaft 2 to the effect manual steering. Inasmuch as the gears are all of equal size, shaft 2 will turn at the same rate as shaft 1 and in the same direction. At the same time the forces present will effect a twisting of shaft 15 about the axis Y—Y. Accordingly, the actuator 17 experiences a rotation about the axis Y—Y, which gives a thrust on either of the valve rods, the shaft 15 moving in and out of the plane of the paper in accordance with the direction of the forces P exerted by the engaged gear teeth. Conventional notation of circles with dots and crosses is utilized to illustrate direction of forces on the gear teeth.

From the representation of Fig. 2 it will be apparent that the final oscillatory motion of the actuator 17, E, is effected from the smaller motion, E′, of the shaft 15.

The sum of all operating forces equals zero since the moment $Md_1$ of shaft 1 effects a tooth thrust P at a distance $r$ from the axis which is balanced by the equal and opposite moment $Md_2$ of shaft 2, both moments being equal to the product of $P \times r$. These two moments are the only outside moments acting on the housing.

Having thus described my invention I am aware that changes may be made without departing from the spirit thereof and therefore I do not seek to be limited to the precise illustration herein given except as set forth in the appended claims.

I claim:

1. In a steering mechanism for effecting manual steering with power steering; a first shaft disposed for manual reversible rotation, a second shaft disposed for transmitting steering torque to a steering linkage, a third shaft carrying a pair of gears, a gear on said first shaft engaging one gear on said third shaft, a gear on said second shaft engaging the other gear on said third shaft, including a housing, said shafts being mounted for relative rotation in said housing, support means supporting said third shaft disposed for oscillation about an axis angularly related to the axes of said first and second shafts and actuating means carried by said shaft for actuating control means of an auxiliary power steering device, wherein said third shaft is rotative about its own axis and effects simultaneous oscillatory motion about said angularly related axis, by the tooth forces exerted on said pair of gears upon rotation of said first shaft, wherein said support means effects freedom of movement of said third shaft for oscillation askew of the said first and second shafts.

2. In a steering mechanism as set forth in claim 1, said first and second shafts being alined, and said third shaft being normally parallel to said first and second shafts.

3. In a steering mechanism as set forth in claim 2, said oscillatory supporting means being disposed intermediate the gears on said third shaft.

4. In a steering mechanism for effecting manual steering with power steering; a first shaft disposed for manual reversible rotation, a second shaft disposed for transmitting steering torque to a steering linkage, a third shaft carrying a pair of gears, a gear on said first shaft engaging one gear on said third shaft, a gear on said second shaft engaging the other gear on said third shaft, including a housing, said shafts being mounted for relative rotation in said housing, means comprising a swivel bearing supporting said third shaft disposed for oscillation about an axis angularly related to the axes of said first and second shafts, and actuating means carried by said shaft for actuating control means of an auxiliary power steering device, wherein said third shaft is rotative about its own axis and effects simultaneous oscillatory motion about said angularly related axis, by tooth forces exerted on said pair of gears upon rotation of said first shaft, including said control means mounted within said housing and comprising axially alined valve operating rods, said actuating means being disposed intermediate the adjacent ends of said rods, either of said rods may be actuated by the oscillatory motion of said actuating means, wherein said support means effects freedom of movement of said third shaft for oscillation askew of the said first and second shafts.

5. In a steering mechanism for effecting manual steering with power steering; a first shaft disposed for manual reversible rotation, a second shaft disposed for transmitting steering torque to a steering linkage, a third shaft carrying a pair of gears, a gear on said first shaft engaging one gear on said third shaft, a gear on said second shaft engaging the other gear on said third shaft, including a housing, said shafts being mounted for relative rotation in said housing, means supporting said third shaft disposed for oscillation about an axis perpendicularly related to the axes of said first and second shafts, and actuating means carried by said shaft for actuating control means of an auxiliary power steering device, wherein said third shaft is rotative about its own axis and effects simultaneous oscillatory motion about said perpendicularly related axis, by tooth forces exerted on said pair of gears upon rotation of said first shaft, wherein said support means effects freedom of movement of said third shaft for oscillation askew of the said first and second shafts.

References Cited in the file of this patent

UNITED STATES PATENTS

| 2,508,057 | Bishop | May 16, 1950 |
| 2,650,669 | Hammond | Sept. 1, 1953 |

FOREIGN PATENTS

| 262,696 | Switzerland | July 15, 1949 |